(12) United States Patent
Kanda et al.

(10) Patent No.: US 6,348,541 B1
(45) Date of Patent: Feb. 19, 2002

(54) PROCESS FOR PREPARING A WATER-IN-OIL EMULSION

(75) Inventors: Shoichi Kanda; Takeshi Narita; Masahiro Ushigome; Masaharu Nagahama, all of Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 08/116,555

(22) Filed: Sep. 7, 1993

Related U.S. Application Data

(63) Continuation of application No. 07/635,009, filed on Dec. 28, 1990, now abandoned.

(30) Foreign Application Priority Data

Dec. 28, 1989 (JP) .............................................. 1-338334

(51) Int. Cl.⁷ .............................. C08F 2/32; C08K 5/00; C08K 5/06
(52) U.S. Cl. ........................ 524/753; 524/762; 524/768; 524/794; 524/801; 516/29; 516/30
(58) Field of Search .......................... 252/308; 524/801, 524/753, 762, 768, 794; 516/29, 30

(56) References Cited

U.S. PATENT DOCUMENTS

| | | | | |
|---|---|---|---|---|
| 3,624,036 A | * | 11/1971 | Kekish ........................ | 524/801 |
| 4,485,209 A | * | 11/1984 | Fan et al. .................... | 524/801 |
| 4,599,390 A | * | 7/1986 | Fan et al. .................... | 526/240 |
| 4,783,513 A | * | 11/1988 | Cadel et al. ................. | 526/216 |
| 4,889,887 A | * | 12/1989 | Fan et al. .................... | 524/510 |
| 4,970,260 A | * | 11/1990 | Lundberg et al. ............ | 524/516 |

OTHER PUBLICATIONS

Encyclopedia of Polymer Science and Engineering, vol. 13 (John Wiley and Sons, NY) 1988,** pp. 776–783.*

* cited by examiner

*Primary Examiner*—Daniel S. Metzmaier
(74) *Attorney, Agent, or Firm*—Sughrue Mion, PLLC

(57) ABSTRACT

A process for preparing a water-in-oil emulsion of a water-soluble polymer is disclosed, comprising polymerizing at least one water-soluble vinyl monomer in a water-in-oil emulsion, wherein the dissolved oxygen concentration of the emulsion under polymerization is about 100 ppb or less. The desired emulsion can be obtained without being accompanied by the formation of agglomerates.

16 Claims, No Drawings

PROCESS FOR PREPARING A WATER-IN-OIL EMULSION

This is a Continuation of application Ser. No. 07/635,009 filed Dec. 28, 1990, now abandoned.

FIELD OF THE INVENTION

This invention relates to a process for preparing a water-in-oil (W/O) emulsion of a water-soluble polymer. More particularly, it relates to a process for preparing a W/O emulsion in a very stable manner while inhibiting the formation of agglomerates which accompanies the preparation.

BACKGROUND OF THE INVENTION

Water-soluble polymers typically including polyacrylamide and copolymers mainly comprising acrylamide have been widely used in various fields as, for example, flocculating agents, thickeners, wet strength agents, electrolytic refining agents, and chemicals for petroleum recovery.

These water-soluble polymers are generally supplied in the form of a powder, a gel, or a W/O emulsion. The W/O emulsion can be dispersed or dissolved in an aqueous medium more rapidly and more easily than the former two types of products and has therefore been the focus of more attention.

However, preparation of such a W/O emulsion is accompanied by formation of agglomerates in a polymerization apparatus comprising a polymerization vessel and connected circulating line, etc., which has made the production process complicated and reduced production capacity. Namely, the agglomerate attached to the inner wall of a polymerization apparatus causes operational disorders, such as reduction in cooling efficiency, and removal of the agglomerates requires a great deal of time and labor, which results in a reduction in operating efficiency for production. Moreover, formation of agglomerates reduces the effective content of the water-soluble polymer in the emulsion. All these problems result in an increase in production cost.

SUMMARY OF THE INVENTION

The present invention seeks to solve these problems arising from formation of agglomerates, thus making a considerable contribution, particularly in production on an industrial scale.

In order to overcome the above-described problems, the inventors have conducted extensive investigations from various aspects, such as emulsion compositions, surface active agents and other additives, and stirring conditions. As a result, it has been surprisingly found that control of the dissolved oxygen concentration in an emulsion during polymerization to about 100 ppb or below is extremely effective to suppress formation of agglomerates.

The above and other objectives and advantages are obtained by the present invention which relates to a process for preparing a W/O emulsion of a water-soluble polymer comprising polymerizing at least one water-soluble vinyl monomer in a W/O emulsion, wherein the dissolved oxygen concentration of the emulsion under polymerization is about 100 ppb or less.

The W/O emulsion prepared by the process according to the present invention comprises an aqueous phase comprising at least one water-soluble polymer in the form of colloidal particles or droplets dispersed in an oily phase comprising a hydrophobic liquid and a W/O emulsifying agent.

DETAILED DESCRIPTION OF THE INVENTION

Water-soluble vinyl monomers which can be used to obtain the water-soluble polymer used in the present invention, for example, include acrylamide, methacrylamide, 2-acrylamido-2-methylpropanesulfonic acid (or a salt thereof), acrylic acid (or a salt thereof), dimethylaminoethyl (meth)acrylate, diethylaminoethyl (meth)acrylate, dimethylaminopropyl (meth)acrylate, dimethylaminohydroxypropyl (meth)acrylate, dimethylaminoethyl acrylamide, quaternary ammonium salts of these cationic monomers (e.g., methacryloyloxyethyltrimethylammonium chloride), and vinylpyrrolidone. These monomers may be used either individually to give homopolymers, or in combination of two or more thereof to give copolymers or higher polymers.

As noted above, the water-soluble vinyl monomer is in an aqueous (discontinuous) phase in the form of colloidal particles or droplets. Such colloidal particles are dispersed in an oily or continuous phase, described below.

Hydrophobic liquids which can be used in the oily phase of the W/O emulsion include liquid hydrocarbons and substituted liquid hydrocarbons. Examples of preferred hydrophobic liquids are halogenated hydrocarbons, e.g., perchloroethylene, and aromatic or aliphatic hydrocarbons, e.g., dodecane, tetradecane, benzene, xylene, kerosene, and liquid paraffin, with aliphatic hydrocarbons being the most preferred.

Emulsifying surface active agents which are preferably used as agents for emulsion formation in the oily phase of the W/O emulsion include those having a hydrophiliclipophilic balance (HLB) of from 1 to 10, and more preferably from 2 to 6, e.g., sorbitan monooleate, sorbitan monostearate, polyoxyethylene sorbitan monooleate, polyoxyethylene oleyl ether, polyoxyethylene nonylphenyl ether, and mixtures thereof.

The proportion of the aqueous phase in the emulsion preferably ranges from about 50 to 90% by weight, and more preferably from 55 to 80% by weight, based on the total weight of the emulsion. The amount of the monomer(s) in the emulsion preferably ranges from about 15 to 80% by weight, and more preferably from 20 to 70% by weight, based on the total weight of the emulsion.

In order to obtain a stable emulsion, the emulsifying surface active agent is preferably used in an amount of from about 1.0 to 20.0% by weight, and more preferably from 2.0 to 15.0% by weight, based on the total weight of the hydrophobic liquid.

The W/O emulsion of the present invention can be obtained by mechanically agitating a mixture of the above-described components by means of, for example, a Waring blender.

After preparation of the W/O emulsion containing the water-soluble vinyl monomer(s) as described above, inhibiting the formation of agglomerates during polymerization is accomplished by reducing the dissolved oxygen concentration of the emulsion under polymerization to an extremely low level, i.e., about 100 ppb or less, and preferably 50 ppb or less. Removal of oxygen can be achieved by blowing nitrogen or argon through the emulsion in a closed container through a gas inlet.

Production of a W/O emulsion containing a water-soluble polymer can be carried out by known techniques, such as the process disclosed in JP-B-34-10644 (the term "JP-B" as used herein means an "examined published Japanese patent application") by Banderhoff, et al. Of course, such known techniques do not include carrying out polymerization under conditions of reduced dissolved oxygen concentration, the essence of the present invention. In short, an aqueous phase containing at least one water-soluble monomer and a hydrophobic liquid are mixed, emulsified and dispersed with the aid of an emulsifying surface active agent, as generally discussed above. After reducing the dissolved oxygen concentration of the emulsion to about 100 ppb or less as mentioned above, the resulting W/O emulsion containing the water-soluble monomer(s) is subjected to polymerization under such reduced dissolved oxygen conditions. Banderhoff et al disclose conducting polymerization in the presence of a polymerization initiator capable of forming a free radical to thereby obtain a W/O emulsion of the water-soluble polymer, but other types of emulsion polymerization may also be employed, as long as it is carried out under the reduced dissolved oxygen conditions of the present invention.

Examples of suitable polymerization initiators include redox initiators comprising a combination of a peroxide, e.g., a persulfate and an alkyl peroxide, and a reducing agent, e.g., a sulfite, a ferrous salt and an amine compound; and azo type pyrolysis initiators, e.g., azobisisobutyronitrile, 2,2'-azobis (2-amidinopropane) hydrochloride, and 4,4'-azobis(4-cyanovaleric acid). Polymerization may also be induced by light irradiation in the presence of a photosensitizer, e.g., benzophenone and benzoin methyl ether.

These polymerization initiator and photosensitizer are respectively used in an amount usually ranging from about 10 to 5000 ppm, and preferably from 30 to 3000 ppm, based on the monomer(s).

If desired, the system undergoing reversed phase emulsion polymerization may further contain, in addition to the above-mentioned components, such commonly used components as chain transfer agents, other surface active agents for inversion, chelating agents, buffering agents, salts, and the like.

After polymerization, the W/O emulsion containing the water-soluble polymer according to the present invention can be inverted to an aqueous solution of the water-soluble polymer in a known manner, e.g., by adding the emulsion to an aqueous medium containing a surface active agent for inversion, or by adding a surface active agent for inversion to the emulsion and then adding the emulsion to an aqueous medium.

According to the present invention, a W/O emulsion of a water-soluble polymer can be prepared while considerably suppressing formation of agglomerates. The present invention is particularly advantageous for industrial production.

The present invention is now illustrated in greater detail with reference to Examples, but it should be understood that the present invention is not deemed to be limited thereto. All the percents and parts are by weight unless otherwise indicated.

EXAMPLE 1 AND COMPARATIVE EXAMPLE 1

1) Preparation of W/O Emulsion:

448.0 parts of a 50% aqueous solution of acrylamide and 280.0 parts of a 80% aqueous solution of methacryloyloxyethyltrimethylammonium chloride (hereinafter referred to as METAC) were added to 344.0 parts of water to prepare an aqueous phase. An oily phase comprising 480.0 parts of a liquid aliphatic hydrocarbon ("Isozol-300" produced by Nisseki Kagaku), 16.0 parts of glycerol monostearate ("Leodor MS-60" produced by Kao; HLB: 3.5), and 32.0 parts of sorbitan monooleate ("Leodor SP-010" produced by Kao; HLB: 4.8) was added to the aqueous phase, and the mixture was stirred in a Waring blender for 1 minute to obtain a W/O emulsion.

The resulting W/O emulsion was charged in a 2000 ml separable flask equipped with a stirrer, an inlet for introducing nitrogen, a thermometer, and a gas outlet. Nitrogen gas was blown into the emulsion to remove dissolved oxygen. The dissolved oxygen concentration of the emulsion was measured with a dissolved oxygen analyzer ("Model 126122" manufactured by Orbisphere), and nitrogen blowing was stopped at the point when the dissolved oxygen concentration was decreased to the predetermined levels shown in Table 1 below.

Then, the emulsion was kept at 50° C. on a water bath, and 2,2'-azobis-2,4-dimethylvaleronitrile (0.05 g in 1 ml of toluene) was added thereto as a polymerization initiator. The system was allowed to polymerize until the residual monomer content was reduced to 1% or less.

2) Determination of Aqglomerate:

In a 300 ml glass-made beaker, 90.8 parts of "Isozol-300", 3.0 parts of "Leodor MS-60", and 6.0 g of "Leodor SP-010" were placed, and the mixture was stirred to prepare a uniform solution. 100 parts of a W/O emulsion, which was being tested, was added to the solution which was then stirred for 1 minute. The solution was filtered through a SUS-made sieve of 80 mesh whose weight had been measured. After allowing the solution to stand for 5 minutes, the sieve was weighed. The amount of agglomerate was obtained from equation:

$$\text{Amount of Agglomerate (\%)} = \frac{\text{Weight Gain of Sieve}}{(\text{Weight of Emulsion}) \times (\text{Weight Fraction of Polymer})} \times 100$$

The results obtained are shown in Table 1.

TABLE 1

|  | Dissolved Oxygen Concentration (ppb) | Amount of Agglomerate (%) |
|---|---|---|
| Example 1-1 | 50 | 0.6 |
| Example 1-2 | 10 | 0.05 |
| Comparative Example 1 | 200 | 8.3 |

EXAMPLE 2 AND COMPARATIVE EXAMPLE 2

716.8 parts of a 50% aqueous solution of acrylamide and 298.8 parts of a 30% aqueous solution of sodium acrylate were added to 57.2 parts of water to prepare an aqueous phase. An oily phase comprising 480.0 parts of "Isozol-300", 16.0 parts of "Leodor MS-60", and 32.0 parts of "Leodor SP-010" was added to the aqueous phase, and the mixture was stirred in a Waring blender for 1 minute to obtain a W/O emulsion.

The resulting W/O emulsion was charged in a 2000 ml separable flask equipped with a stirrer, an inlet for introducing nitrogen, a thermometer, and a gas outlet, and benzophenone (0.05 g in 1 ml of toluene) was added thereto. Nitrogen gas was blown into the emulsion to remove dissolved oxygen. The dissolved oxygen concentration of the emulsion was measured in the same manner as in Example 1, and nitrogen blowing was stopped at the point when the dissolved oxygen concentration was decreased to a prescribed level shown in Table 2 below.

Then, the emulsion was kept at 40° C. on a water bath and irradiated with light emitted from a ultraviolet lamp to conduct polymerization until the residual monomer content was reduced to 1% or less. The results obtained are shown in Table 2.

TABLE 2

|  | Dissolved Oxygen Concentration (ppb) | Amount of Agglomerate (%) |
|---|---|---|
| Example 2-1 | 80 | 0.8 |
| Example 2-2 | 30 | 0.09 |
| Example 2-3 | 10 | 0.04 |
| Comparative Example 2 | 300 | 12.6 |

While the invention has been described in detail and with reference to specific examples thereof, it will be apparent to one skilled in the art that various changes and modifications can be made therein without departing from the spirit and scope thereof.

What is claimed is:

1. A process for preparing a water-in-oil emulsion of a water-soluble polymer comprising polymerizing at least one water-soluble vinyl monomer in a water-in-oil emulsion, wherein the dissolved oxygen concentration of the emulsion before initiating polymerization is about 100 ppb or less.

2. A process as claimed in claim 1, wherein the dissolved oxygen concentration of the emulsion under polymerization is 50 ppb or less.

3. A process as claimed in claim 1, wherein said at least one water-soluble vinyl monomer is selected from the group consisting of acrylamide, methacrylamide, 2-acrylamido-2-methylpropanesulfonic acid or a salt thereof, acrylic acid or a salt thereof, dimethylaminoethyl (meth)acrylate, diethylaminoethyl (meth)acrylate, dimethylaminopropyl (meth)acrylate, dimethylaminohydroxypropyl (meth)acrylate, dimethylaminoethyl acrylamide, quaternary ammonium salts of any of the above monomers, and vinylpyrrolidone, individually or in combination.

4. A process as claimed in claim 3, wherein the quaternary ammonium salt is methacryloyloxyethyltrimethylammonium chloride.

5. A process according to claim 1, wherein said water-in-oil emulsion to be polymerized comprises an aqueous phase comprising said at least one water-soluble vinyl monomer in the form of colloidal particles dispersed in an oily phase comprising a hydrophobic liquid and an emulsifying surface active agent.

6. A process as claimed in claim 5, wherein the hydrophobic liquid is selected from the group consisting of halogenated hydrocarbons, aromatic hydrocarbons, and aliphatic hydrocarbons.

7. A process as claimed in claim 5, wherein the emulsifying surface active agent has a hydrophilic-lipophilic balance (HLB) of from 1 to 10.

8. A process as claimed in claim 7, wherein the emulsifying surface active agent is selected from the group consisting of sorbitan monooleate, sorbitan monostearate, polyoxyethylene sorbitan monooleate, polyoxyethylene oleyl ether, polyoxyethylene nonylphenyl ether, and mixtures thereof.

9. A process as claimed in claim 5, wherein the proportion of the aqueous phase in the emulsion ranges from about 50 to 90% by weight.

10. A process as claimed in claim 5, wherein the emulsifying surface active agent is present in an amount from about 1.0 to 20.0% by weight based on the total weight of the hydrophobic liquid.

11. A process as claimed in claim 1, wherein the amount of the monomer in the emulsion ranges from about 15 to 80% by weight.

12. A process as claimed in claim 1, wherein said reducing comprises blowing nitrogen or argon through the emulsion in a closed container through a gas inlet.

13. A process as claimed in claim 1, wherein said polymerizing is free radical polymerization carried out in the presence of a polymerization initiator.

14. A process as claimed in claim 1, wherein said polymerizing is induced by light irradiation in the presence of a photosensitizer.

15. A process for preparing a water-in-oil emulsion of a water-soluble polymer comprising, combining an aqueous phase comprising at least one water-soluble vinyl monomer and an oily phase comprising a hydrophobic liquid and at least one surface active agent to give a mixture, mechanically agitating said mixture to give a water-in-oil emulsion, reducing the dissolved oxygen concentration of the emulsion to about 100 ppb or less, and polymerizing said at least one water-soluble vinyl monomer under said reduced dissolved oxygen concentration of about 100 ppb or less.

16. A water-in-oil emulsion comprising an aqueous phase comprising a water-soluble polymer in the form of colloidal particles dispersed in an oily phase comprising a hydrophobic liquid and at least one surface active agent, wherein said emulsion is prepared by polymerizing at least one water-soluble vinyl monomer in a water-in-oil emulsion, wherein the dissolved oxygen concentration of the emulsion before initiating polymerization is about 100 ppb or less.

* * * * *